(12) United States Patent
Theobald

(10) Patent No.: US 10,563,676 B1
(45) Date of Patent: Feb. 18, 2020

(54) HYDROSYMBIOSIS

(71) Applicant: Vecna Technologies, Inc., Cambridge, MA (US)

(72) Inventor: Daniel Theobald, Somerville, MA (US)

(73) Assignee: VECNA ROBOTICS, INC., Waltham, MA (US)

( * ) Notice: Subject to any disclaimer, the term of this patent is extended or adjusted under 35 U.S.C. 154(b) by 216 days.

(21) Appl. No.: 14/312,272

(22) Filed: Jun. 23, 2014

(51) Int. Cl.
*F15B 15/02* (2006.01)

(52) U.S. Cl.
CPC .................................. *F15B 15/02* (2013.01)

(58) Field of Classification Search
CPC ..... F15B 11/024; F15B 11/042; F15B 11/044; F15B 15/02; F15B 15/1409; F15B 18/00
USPC .......................................................... 91/183
See application file for complete search history.

(56) References Cited

U.S. PATENT DOCUMENTS

| | | | |
|---|---|---|---|
| 2,166,423 A | 7/1939 | Clark | |
| 4,437,385 A | 3/1984 | Kramer et al. | |
| 5,460,001 A * | 10/1995 | Kato | E02F 9/2232 60/426 |
| 5,615,593 A | 4/1997 | Anderson et al. | |
| 6,446,433 B1 | 9/2002 | Holt et al. | |
| 6,467,264 B1 | 10/2002 | Stephenson et al. | |
| 6,691,603 B2 | 2/2004 | Linerode et al. | |
| 6,732,512 B2 | 5/2004 | Pfaff et al. | |
| 6,789,387 B2 | 9/2004 | Brinkman | |
| 7,255,000 B2 | 8/2007 | Pitkänen et al. | |
| 7,621,211 B2 | 11/2009 | Ma et al. | |
| 7,719,222 B2 | 5/2010 | Theobald | |
| 7,849,686 B2 | 12/2010 | Nielsen | |
| 8,695,333 B2 * | 4/2014 | Vigholm | E02F 9/2217 60/461 |
| 2003/0106419 A1 | 6/2003 | Yoshino | |
| 2004/0011192 A1 * | 1/2004 | Frediani | F15B 11/006 91/459 |
| 2004/0050241 A1 | 3/2004 | Sakaki | |
| 2008/0041467 A1 | 2/2008 | Stretch | |
| 2008/0219820 A1 * | 9/2008 | Kiegerl | E02F 3/3411 414/469 |
| 2010/0122528 A1 * | 5/2010 | Beschorner | F15B 21/14 60/424 |
| 2011/0114209 A1 | 5/2011 | Barbetti et al. | |
| 2012/0180470 A1 * | 7/2012 | Schroeder | E02F 9/2217 60/414 |
| 2015/0120048 A1 | 4/2015 | Summer et al. | |

FOREIGN PATENT DOCUMENTS

DE 102010035747 5/2013

OTHER PUBLICATIONS

U.S. Appl. No. 14/261,826, dated Apr. 25, 2014, Theobald.
U.S. Appl. No. 14/312,286, dated Apr. 25, 2014, Theobald.

* cited by examiner

*Primary Examiner* — Michael Leslie
*Assistant Examiner* — Daniel S Collins

(57) ABSTRACT

Apparatuses, systems and methods are provided for controlling one or more fluid actuated devices; e.g., actuators such as hydraulic cylinders. A method is provided, for example, involving actuation fluid, a first actuator and a second actuator. During this method, a quantity of the actuation fluid within the second actuator is pressurized using a quantity of the actuation fluid within the first actuator.

8 Claims, 9 Drawing Sheets

HYDROSYMBIOSIS

BACKGROUND OF THE INVENTION

1. Technical Field

This disclosure relates generally to controlling a fluid actuated device such as, for example, a hydraulic cylinder of a mobile robot.

2. Background Information

A mobile robot as well as various other robotic systems and industrial equipment may include an actuation system for moving one or more of its sub-systems; e.g., manipulator arms, end effectors, etc. Various actuation systems are known in the art, which include hydraulic actuation systems and electric actuation systems. While a hydraulic actuation system can utilize a single motorized hydraulic pump for operating multiple actuators, such a system typically cannot provide precise control of its actuators; e.g., actuator movement may be choppy. In addition, hydraulic actuation systems may be relatively energy inefficient where a hydraulic pump is operated to maintain a constant and/or high hydraulic fluid supply pressure. While an electric actuation system can provide more smooth and/or precise control of its actuators, such a system may be expensive, complicated and/or less energy efficient than a hydraulic actuation system.

There is a need in the art for an improved actuation system for controlling a fluid actuated device such as, for example, a hydraulic cylinder.

SUMMARY OF THE DISCLOSURE

Apparatuses, systems and methods are provided for controlling one or more fluid actuated devices; e.g., actuators such as hydraulic cylinders. A method is provided, for example, involving actuation fluid, a first actuator and a second actuator. During this method, a quantity of the actuation fluid within the second actuator is pressurized using a quantity of the actuation fluid within the first actuator. This transfer of fluid pressure and force between actuators may be referred to as hydrosymbiosis.

BRIEF DESCRIPTION OF THE DRAWINGS

The following detailed description will be better understood when read in conjunction with the appended drawings, in which there is shown one or more embodiments of the present disclosure. It should be understood, however, the various embodiments of the present disclosure are not limited to the precise arrangements and instrumentalities shown in the drawings.

FIG. 7 is a block diagram of an alternate embodiment actuation system for moving a plurality of actuatable components;

DETAILED DESCRIPTION

Figure 1:
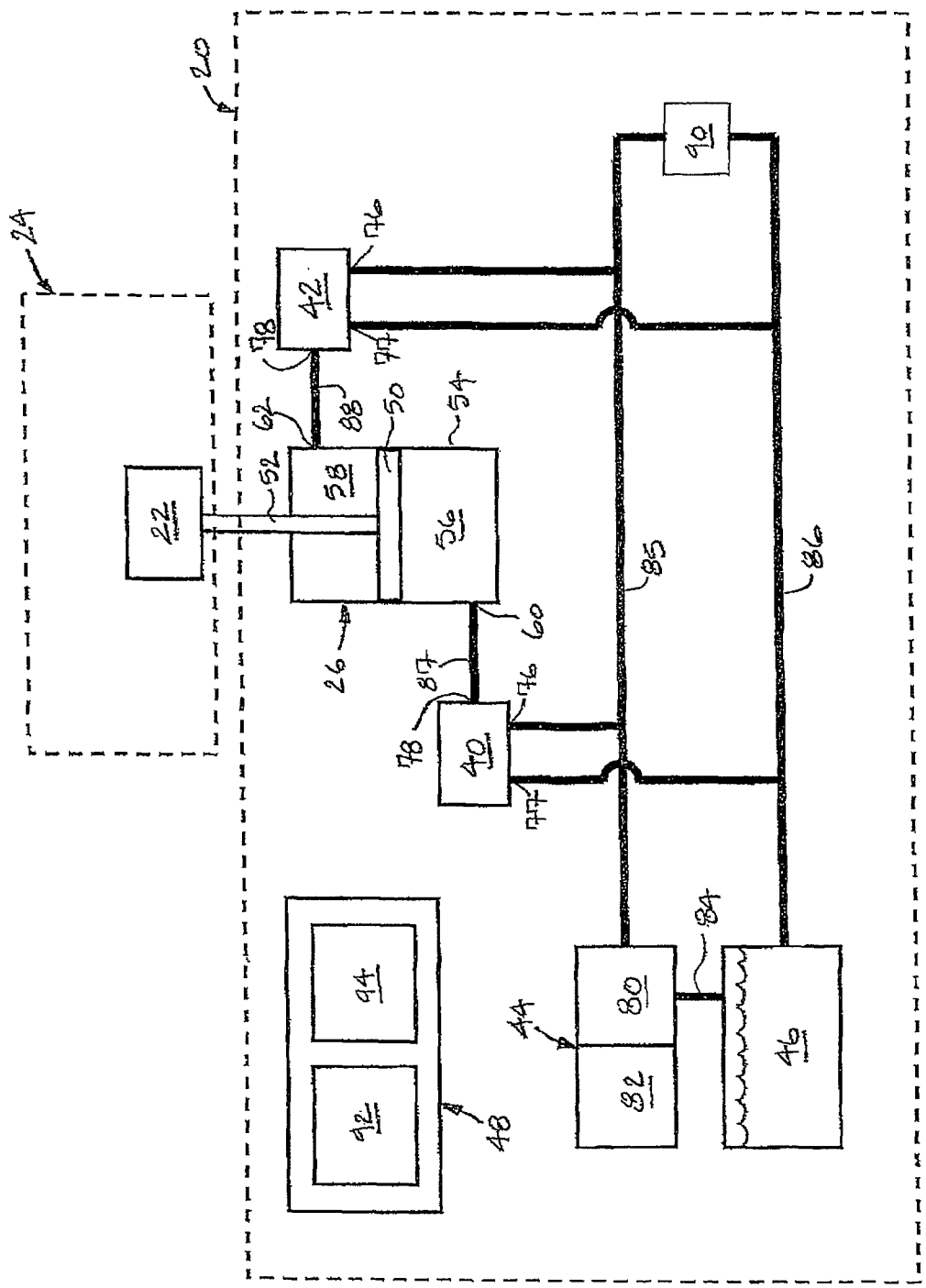
FIG. 1 is a block diagram of an actuation system for moving at least one actuatable component.

FIG. 1 illustrates an actuation system 20 for moving at least one actuatable component 22 of an apparatus 24 or a system. The actuatable component 22 may be any type of device or object which can be moved by at least one actuator 26. The term "move" may describe a process by which the actuator 26 reorients, repositions, rearranges and/or reconfigures the component 22 relative to at least one other component and/or a coordinate system.

Figure 2:
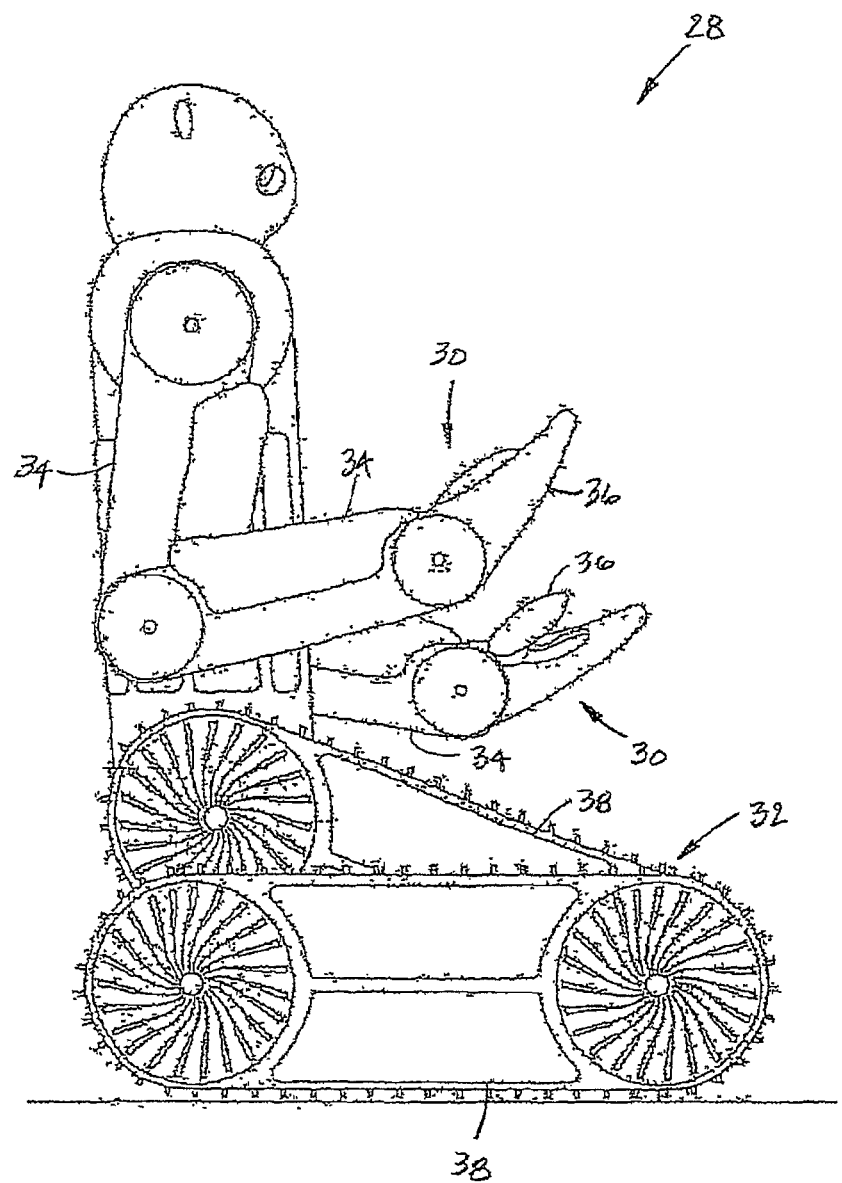
FIG. 2 is a side illustration of a mobile robot with which the actuation system and/or the at least one actuatable component of FIG. 1 may be included.

FIG. 2 illustrates a mobile robot 28. Briefly, this mobile robot 28 may be configured as an autonomous mobile robot, which may perform one or more tasks without continuous outside control and/or intervention. The mobile robot 28, for example, may receive instructions to perform a certain task within its operating environment. The mobile robot 28 may subsequently self-determine and perform the operation(s) necessary to complete the task based on, for example, its current location, surrounding obstacles, operating environment layout, type of task to be performed, etc. The mobile robot 28 may also adapt to unknown, new and/or changing operating environment characteristics (e.g., layout, terrain, obstacles and/or other features) without additional outside control and/or intervention.

The mobile robot 28 may be fully autonomous during performance of one or more tasks. The mobile robot 28 may be semi-autonomous during performance of one or more tasks. The mobile robot 28 may also or alternatively be controlled by an individual (e.g., a human operator) during performance of one or more tasks.

The term "fully autonomous" may describe an apparatus that performs one or more tasks without, for example, any outside control and/or intervention. A fully autonomous mobile robot, for example, may perform a task without receiving instructions (e.g., vectors, commands, etc.) from a human operator during performance of the task.

The term "semi-autonomous" may describe an apparatus that performs one or more tasks without, for example, continuous outside control. A semi-autonomous mobile robot, for example, may perform a task utilizing one or more periodic instructions from an operator (e.g., a human controller) that bound and/or qualify the performance of the task. The instructions may provide, for example, an updated location of where the task is to be performed, identify an unknown obstacle, control the scope of the task, control when the task should be performed, etc.

The mobile robot 28 of FIG. 2 includes a plurality of (e.g., multi-axis) manipulators such as a plurality of robotic manipulator arms 30 and a plurality of robotic manipulator legs/track systems 32, one of which systems 32 is shown in FIG. 2. Each of the manipulator arms 30 includes a plurality of arm segments 34 and an end effector 36; e.g., a robotic hand/gripping mechanism. Each of the manipulator legs/ track systems 32 includes a plurality of leg/track segments 38. In this embodiment, the apparatus 24 of FIG. 1 may be configured as or included in the mobile robot 28 or one of the manipulators 30 and 32. The actuatable component 22 of FIG. 1 may be configured as or included in one of the manipulator components 34, 36 and 38. The actuation system 20 of the present disclosure, however, is not limited to moving or being arranged with any particular types or configurations of actuatable components, apparatuses or systems.

The actuation system 20 of FIG. 1 is configured as a fluid-based actuation system; e.g., a hydraulic actuation system or a pneumatic actuation system. More particularly, as described below in further detail, the actuation system 20 pumps and/or otherwise displaces actuation fluid to operate its actuator 26 (or actuators). The actuation fluid may be hydraulic fluid; e.g., a substantially incompressible liquid that may include mineral oil and/or water. The actuation fluid may alternatively be pneumatic fluid; e.g., compressible gas such as, for example, compressed air. The actuation system 20, however, is not limited to using the foregoing exemplary actuation fluids. It is also worth noting the actuation fluid may be a combination of liquid and gas.

The actuation system 20 is described below as a hydraulic actuation system for ease of description. However, as indicated above, the actuation system 20 of the present disclosure is not limited to such a hydraulic embodiment.

The actuation system 20 of FIG. 1 includes the actuator 26, a valve system with a first valve 40 and a second valve 42, an actuation fluid pump system 44 and an actuation fluid reservoir 46 (e.g., a tank or a sump). The actuation system 20 also includes a controller 48 in signal communication (e.g., hardwired and/or wirelessly coupled) with one or more of the actuation system components 40, 42 and 44. The controller 48, of course, may also be in signal communication with (and control and/or be controlled by) one or more other components of, for example, the mobile robot 28 of FIG. 2.

The actuator 26 of FIG. 1 is configured as a hydraulic cylinder. The actuator 26 includes a piston 50, a shaft 52 and a housing 54. The piston 50 is slidably arranged within an internal cavity of the housing 54. The piston 50 divides the internal cavity into and fluidly separates a first chamber 56 and a second chamber 58. The shaft 52 is connected to (e.g., attached to or formed integral with) the piston 50. The shaft 52 extends through the second chamber 58 and out of the housing 54 to a distal end, which is connected to or otherwise engaged with the actuatable component 22. The housing 54 includes a sidewall with first and second orifices 60 and 62; e.g., inlet/outlet ports. The first orifice 60 extends through the housing 54 sidewall and is fluidly coupled with the first chamber 56. The second orifice 62 extends though the housing 54 sidewall and is fluidly coupled with the second chamber 58.

The actuator 26 is described above and illustrated in FIG. 1 as a hydraulic cylinder for ease of description. However, the actuation system 20 of the present disclosure is not limited to including such a hydraulic cylinder actuator. For example, the actuator 26 may alternatively be configured as a rotary hydraulic actuator, a spring loaded cylinder, a pneumatic actuator, etc.

Figure 3:
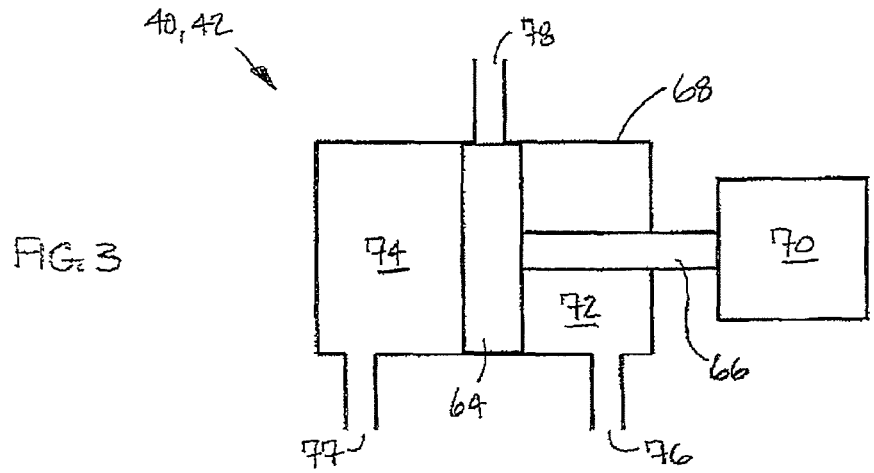
FIG. 3 is a block diagram of a valve in a closed position.
Figure 4:
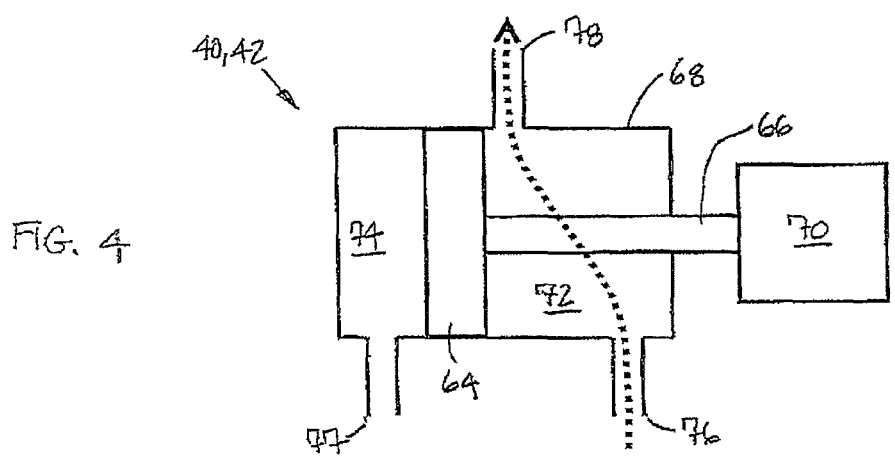
FIG. 4 is a block diagram of the valve of FIG. 3 in an open position.
Figure 5:
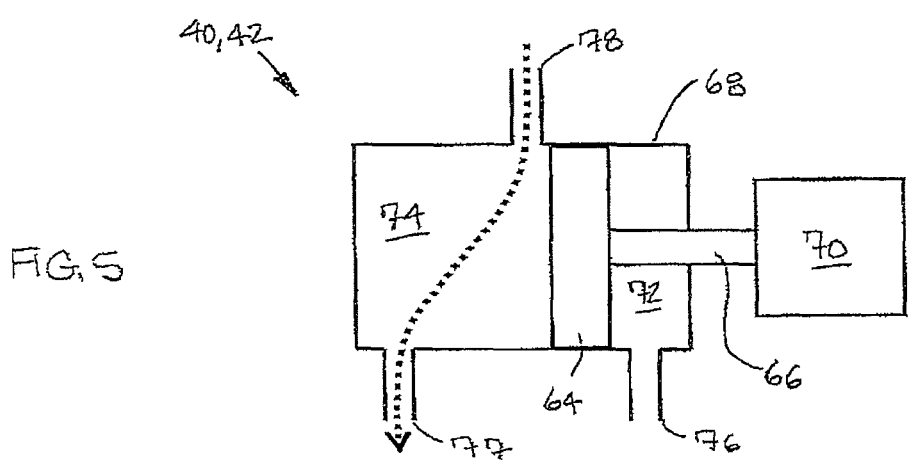
FIG. 5 is a block diagram of the valve of FIG. 3 in another open position.

Referring to FIGS. 3 to 5, the first valve 40 and/or the second valve 42 may each be configured as a spool valve. Each valve 40, 42, for example, may include a valve element 64 (e.g., a spool or piston), a shaft 66, a housing 68 and an electric motor 70 (or any other type of drive device). The valve element 64 is slidably arranged within an internal cavity of the housing 68. The valve element 64 divides the internal cavity into and fluidly separates a chamber 72 and a chamber 74. The shaft 66 is connected to the valve element 64. The shaft 66 extends through the chamber 72 and out of the housing 68 to a distal end, which is connected to or otherwise engaged with the motor 70. The housing 68 includes a sidewall with a plurality of orifices 76-78; e.g., ports. The orifice 76 extends through the housing 68 sidewall and is fluidly coupled with the chamber 72. The orifice 77 extends through the housing 68 sidewall and is fluidly coupled with the chamber 74. The orifice 78 extends through the housing 68 sidewall and may be fluidly coupled with or decoupled from the chamber 72 and/or the chamber 74 depending on the position of the valve element 64.

The motor 70 is adapted to slide, twist and/or otherwise move the valve element 64 within the housing 68 to open and close the respective valve 40, 42. Referring to FIG. 3, for example, the motor 70 may move the valve element 64 to a closed position to close the valve 40, 42 and thereby fluidly decouple the orifice 78 from the orifices 76 and 77. Referring to FIG. 4, the motor 70 may move the valve element 64 to an open position to (e.g., fully) open the valve 40, 42 and thereby fluidly couple the orifice 78 to the orifice 76. Referring to FIG. 5, the motor 70 may move the valve element 64 to another open position to (e.g., fully) open the valve 40, 42 and thereby fluidly couple the orifice 78 to the orifice 77. Of course, the motor 70 may also move the valve element 64 to one or more intermediate positions to partially open/close the valve 40, 42 in order to provide a reduced flow of actuation fluid through the orifice 78. By moving the valve element 64 with the motor 70 as described above, each valve 40, 42 can regulate the flow (if any) of actuation fluid therethrough.

The first and the second valves 40 and 42 are described above and illustrated in FIGS. 3 to 5 as spool valves for ease of description. However, the valve system and the actuation system 20 of the present disclosure are not limited to including such spool valves. In addition, the first and/or the second valves 40 and 42 described above and illustrated in FIGS. 3 to 5 may each be replaced by a plurality of two-way valves. For example, the first valve 40 and/or the second valve 42 may each alternatively be configured as poppet valves or any other type of valve or fluid regulation device.

Referring again to FIG. 1, the pump system 44 includes an actuation fluid pump 80 (e.g., a hydraulic fluid pump) configured with an electric motor 82 (or any other type of drive device). The pump system 44 may be configured as a constant pressure pump system. Alternatively, the pump system 44 may be configured as a variable pressure pump system. The motor 82 may be configured as a constant or variable speed electric motor. A transmission may also or alternatively be connected between the pump 80 and the motor 82.

An inlet orifice of the pump 80 is fluidly coupled with an outlet orifice of the reservoir 46 through a flowpath 84. An outlet orifice of the pump 80 is fluidly coupled, in parallel, with the orifices 76 of the valves 40 and 42 through a flowpath 85; e.g., a source flowpath. The orifices 77 of the valves 40 and 42 are fluidly coupled, in parallel, with an inlet orifice of the reservoir 46 through a flowpath 86; e.g., a return flowpath. The orifice 78 of the first valve 40 is fluidly coupled with the first orifice 60 and the first chamber 56 of the actuator 26 through a flowpath 87. The orifice 78 of the second valve 42 is fluidly coupled with the second orifice 62 and the second chamber 58 of the actuator 26 through a flowpath 88. The flowpaths 85 and 86 may be fluidly coupled together through at least one regulator 90; e.g., a flow and/or pressure regulator. This regulator 90 may be configured to maintain an actuation fluid pressure within the flowpath 85, which is generally higher than an actuation fluid pressure within the flowpath 86.

It is worth noting, the term "flowpath" may describe any structure through which the actuation fluid may be directed. One or more of the flowpaths 84-88, for example, may each include one or more conduits (e.g., pipes), manifolds, path splitters and/or path consolidators. One or more of the flowpaths 84-88 may also or alternatively include one or more other actuation system components other than those described above; e.g., additional valve(s), regulator(s), flow rate and/or pressure meter(s), filter(s), additional pump(s), additional reservoir(s), etc. Of course, one or more of the flowpaths may also be configured without such actuation system components.

The controller 48 may be implemented with a combination of hardware and software. The hardware may include memory 92 and at least one processing device 94, which may include one or more single-core and/or multi-core processors. The hardware may also or alternatively include analog and/or digital circuitry other than that described above.

The memory 92 is configured to store software (e.g., program instructions) for execution by the processing device 94, which software execution may control and/or facilitate performance of one or more operations (or tasks) such as those described in the methods below. The memory 92 may be a non-transitory computer readable medium. For example, the memory 92 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 6:
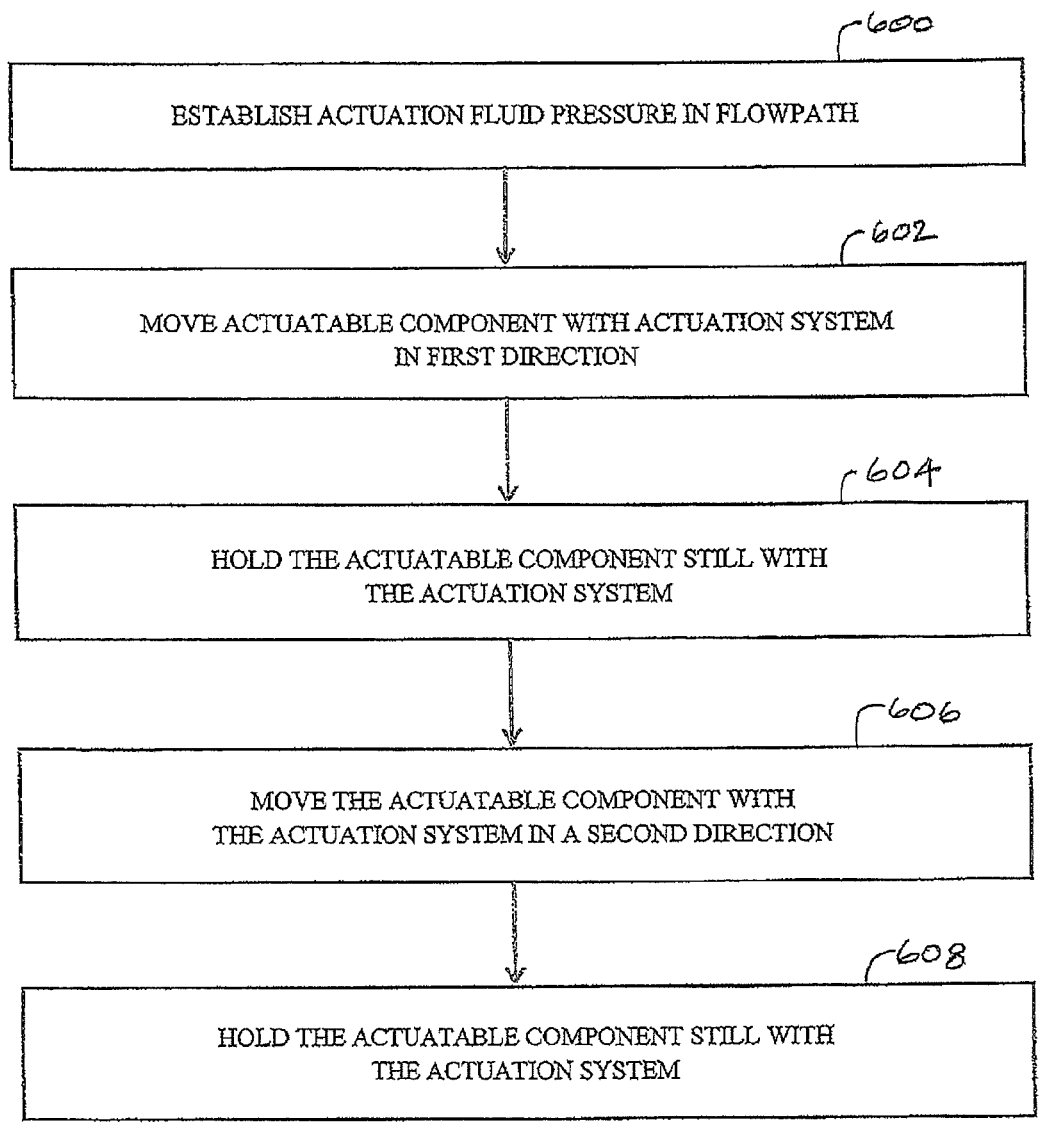
FIG. 6 is a flow diagram of a method involving the actuation system of FIG. 1.
Figure 4:
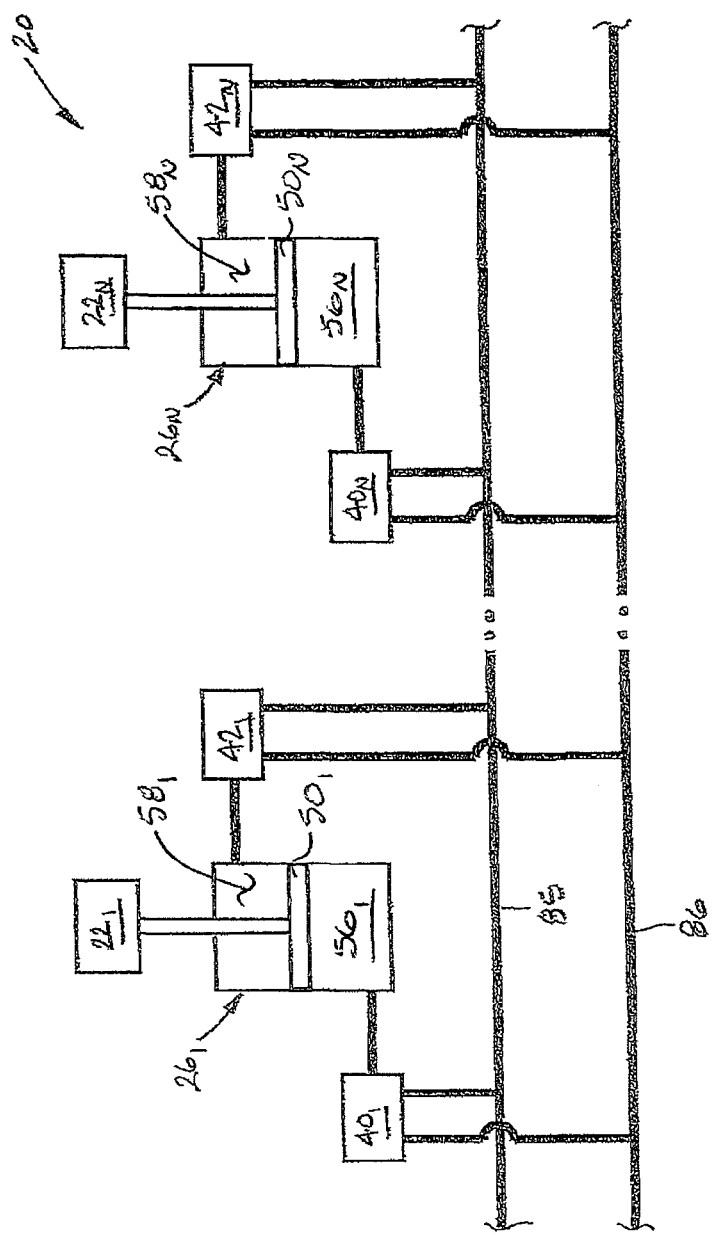

FIG. 6 is a flow diagram of a method for operating an actuation system such as the system 20 of FIG. 1. In step 600, the actuation fluid pressure is established in the flowpath 85. In particular, the controller 48 may signal the pump system 44 to pump the actuation fluid from the reservoir 46 into the flowpath 85 at a certain rate. The pump system 44 may pressurize the pumped actuation fluid to a pressure higher than the desired actuation fluid pressure for the flowpath 85. Under such conditions, the regulator 90 may allow some of the pressurized actuation fluid within the flowpath 85 to flow (e.g., vent) into the flowpath 86 in order to reduce and/or maintain the pressure of the actuation fluid within the flowpath 85 at the desired actuation fluid pressure. Of course, under other conditions, the regulator 90 may prevent the actuation fluid from flowing therethrough.

In step 602, the actuation system 20 moves the actuatable component 22 in a first direction. In particular, the controller 48 may signal the first valve 40 to direct a regulated flow of the pressurized actuation fluid from the flowpath 85 into the first chamber 56 through the flowpath 87. The valve element 64, for example, may be moved towards or to the open position of FIG. 4. The controller 48 may also (or alternatively) signal the second valve 42 to direct a regulated flow of the actuation fluid within the second chamber 58 into the flowpath 86 through the flowpath 88. The valve element 64, for example, may be moved towards or to the open position of FIG. 5. In this manner, the actuation fluid within the first chamber 56 may push the piston 50 towards the second chamber 58 and thereby cause the shaft 52 to move the actuatable component 22 (e.g., upwards).

In step 604, the actuation system 20 may hold the actuatable component 22 still (e.g., static) in a certain orientation, position, arrangement and/or configuration. In particular, the controller 48 may signal the first valve 40 and/or the second valve 42 to close. The valve element 64 of each valve 40, 42, for example, may be moved to the closed position of FIG. 3 thereby preventing actuation fluid from flowing through the flowpaths 87 and 88; e.g., regulating the flow to substantially zero.

In step 606, the actuation system 20 moves the actuatable component 22 in a second direction that may be opposite the first direction. In particular, the controller 48 may signal the first valve 40 to direct a regulated flow of the pressurized actuation fluid from the first chamber 56 into the flowpath 86. The valve element 64, for example, may be moved towards or to the open position of FIG. 5. The controller 48 may also (or alternatively) signal the second valve 42 to direct a regulated flow of the actuation fluid from the flowpath 85 into the second chamber 58. The valve element 64, for example, may be moved towards or to the open position of FIG. 4. In this manner, the actuation fluid within the second chamber 58 (e.g., along with gravity) may push the piston 50 towards the first chamber 56 and thereby cause the shaft 52 to move the actuatable component 22 (e.g., downwards).

In step 608, the actuation system 20 may hold the actuatable component 22 still in another orientation, position, arrangement and/or configuration. In particular, the controller 48 may signal the first valve 40 and/or the second valve 42 to close. The valve element 64 of each valve 40, 42, for example, may be moved to the closed position of FIG. 3 thereby preventing actuation fluid from flowing through the flowpaths 87 and 88; e.g., regulating the flow to substantially zero.

It is worth noting, the first valve 40 and the second valve 42 are operated independent of one another during the method of FIG. 6. For example, the motor 70 of the first valve 40 physically moves its valve element 64 independent of the motor 70 of the second valve 42 moving its valve element 64. The first valve 40 therefore may be selectively opened or closed to a greater or lesser degree than the second valve 42, and vice versa. Furthermore, the valves 40 and 42 may be opened or closed at different times; e.g., time steps. That said, as described above, the controller 48 may control the first valve 40 and the second valve 42 to operate in cooperation with one another; e.g., in unison and/or sequentially. The controller 48, for example, may signal the first and the second valves 40 and 42 to contemporaneously open and/or close in order to control movement of the actuatable component 22.

The foregoing independent, but cooperative, valve operation enables the pressure of the actuation fluid within the first chamber 56 and/or the second chamber 58 to be reduced. For example, the second valve 42 may be operated to substantially equalize the pressure of the actuation fluid within the second chamber 58 with the pressure of the actuation fluid within the flowpath 86 and/or the reservoir 46. The actuation fluid within the second chamber 58 therefore may exert a relatively small (if any) force against the piston 50. As a result, the first valve 40 may be operated to set the pressure of the actuation fluid within the first chamber 56 based (e.g., substantially solely) on the force needed to move the actuatable component 22 (e.g., upwards). Thus, where the actuatable component 22 is relatively light, the pressure of the actuation fluid within the first chamber 56 may be set relatively low. The pump system 44 therefore may establish the actuation fluid pressure within the flowpath 85 at a relatively low level.

The method of FIG. 6 is described above implementing a "HIGH-LOW" mode of operation. The term "HIGH-LOW" may describe a mode of operation where (I) a first actuator chamber is fluidly coupled with a fluid source (e.g., the pump system 44) and its internal volume may increase (II) and an opposing second actuator chamber is fluidly coupled with a fluid return (e.g., the reservoir 46) and its internal volume may decrease. For example, in the step 602, the first chamber 56 receives pressurized actuation fluid from the pump system 44 and the second chamber 58 provides actuation fluid to the reservoir 46. The incoming and outgoing actuation fluid causes and/or increases a pressure differential between the chambers 56 and 58 and, thus, across the piston 50. This pressure differential causes the piston 50 to move in the first direction (e.g., upwards) thereby increasing the first chamber 56 internal volume and decreasing the second chamber 58 internal volume. Such "HIGH-LOW" operation is similarly described above as being implemented in the step 606.

The method of FIG. 6, of course, is not limited to implementing a "HIGH-LOW" mode of operation in the steps 602 and 606. Under certain conditions, for example, the step 602 and/or the step 606 may be implemented in a "HIGH-HIGH" mode of operation. Under certain conditions, the step 602 and/or the step 606 may be implemented in a "LOW-LOW" mode of operation. Under certain conditions, the step 602 and/or the step 606 may also or alternatively be implemented in a "LOW-HIGH" mode of operation.

The term "HIGH-HIGH" may describe a mode of operation where a first actuator chamber and an opposing and/or fluidly discrete second actuator chamber are fluidly coupled with a fluid source (e.g., the pump system 44) substantially contemporaneously. For example, both the chambers 56 and 58 may be concurrently, or one after the other, fluidly coupled with the pump system 44 through the valves 40 and 42. The controller 48 may signal the first valve 40 to open a first amount and direct actuation fluid into the first chamber 56, for example, at a first flow rate. The controller 48 may signal the second valve 42 to open a second amount and direct actuation fluid into the second chamber 58, for example, at a second flow rate, which is different than the first flow rate. To move the piston 50 in the first direction for the step 602, the controller 48 may select the first flow rate to be greater than the second flow rate. In this manner, although both chambers 56 and 58 receive actuation fluid, the different flow rates create and/or increase the pressure differential between the chambers 56 and 58 thereby causing the piston 50 to move. Similarly, to move the piston 50 in the second direction for the step 606, the controller 48 may select the second flow rate to be greater than the first flow rate.

The "HIGH-HIGH" mode of operation may be used to provide a relatively stiff actuator 26 and, for example, a relatively stiff actuation system 20. For example, during this mode of operation, the actuator fluid within the chambers 56 and 58 may be relatively highly (e.g., substantially fully) compressed. An external force acting upon the component 22 therefore would need to be relatively large to further compress the actuation fluid within one of the chambers 56, 58 and thereby move the piston 50 and the component 22. The "HIGH-HIGH" mode of operation therefore may be particularly useful for high precision movement of large loads; e.g., bulky and/or heavy objects. In addition, where the chambers 56 and 58 have different internal volumes, the "HIGH-HIGH" mode of operation may also be more energy efficient than the "HIGH-LOW" mode of operation since the pump system 44 may merely supply a difference between the chamber internal volumes.

The term "LOW-LOW" may describe a mode of operation where a first actuator chamber and an opposing and/or fluidly discrete second actuator chamber are fluidly coupled with a fluid return (e.g., the reservoir 46) substantially contemporaneously. For example, both the chambers 56 and 58 may be concurrently, or one after the other, fluidly coupled with the reservoir 46 through the valves 40 and 42. The controller 48 may signal the first valve 40 to open a first amount and direct actuation fluid out of the first chamber 56, for example, at a first flow rate. The controller 48 may signal the second valve 42 to open a second amount and direct actuation fluid out of the second chamber 58, for example, at a second flow rate, which is different than the first flow rate. To move the piston 50 in the first direction for the step 602, the controller 48 may select the second flow rate to be greater than the first flow rate. In this manner, although both chambers 56 and 58 provide (e.g., lose) actuation fluid, the different flow rates create and/or increase the pressure differential between the chambers 56 and 58 thereby causing the piston 50 to move. Similarly, to move the piston 50 in the second direction for the step 606, the controller 48 may select the first flow rate to be greater than the second flow rate. Alternatively, the flow rates for movement in one direction may be substantially equal where the cross-sectional area of the chamber 58 is different (e.g., greater or less) than the cross-sectional area of the chamber 56.

The "LOW-LOW" mode of operation may be used to provide a relatively compliant actuator 26 and, for example, a relatively compliant actuation system 20. For example, during this mode of operation, the actuator fluid within the chambers 56 and 58 may be relatively uncompressed, or compressed to a relatively small degree. A relatively small or light external force acting upon the component 22 may therefore relatively easily further compress the actuation fluid within one of the chambers 56, 58 and thereby move the piston 50 and the component 22. Here, the actuator 26 may also function as a component damper. The "LOW-LOW" mode of operation therefore may be particularly useful for movement of loads that require damping or overall actuator or system compliance. The "LOW-LOW" mode of operation may also be useful for energy efficient movement of relatively light or medium loads. For example, since both chambers 56 and 58 are fluidly coupled to the reservoir 46, the pump system 44 may consume less energy than in the "HIGH-HIGH" or "HIGH-LOW" modes of operation. In addition, this "LOW-LOW" mode of operation can take advantage of gravitational force to create and/or increase the pressure differential between the chambers 56 and 58.

The term "LOW-HIGH" may describe a hydrosymbiotic mode of operation where pressurized actuation fluid within at one actuator or actuator chamber is utilized to pressurize actuation fluid within at least one other location; e.g., another actuator chamber and/or a flowpath. An example of such LOW-HIGH operation is described below with reference to FIGS. 7 and 8.

FIG. 7 illustrates an embodiment of the actuation system 20 that includes a plurality of actuators $26_1$-$26_N$, where N≥2. One or more of these actuators $26_1$-$26_N$ may each be configured with two valves as described above, or more than two valves as described below in further detail. Alternatively, one or more of the actuators $26_1$-$26_N$ may be configured with a single valve 96. Each of the actuators $26_1$-$26_N$ of FIG. 7 may be adapted to move a discrete actuatable component $22_1$-$22_N$. Alternatively, at least some of the actuators $26_1$-$26_N$ may be adapted to move a common actuatable component.

Figure 8:
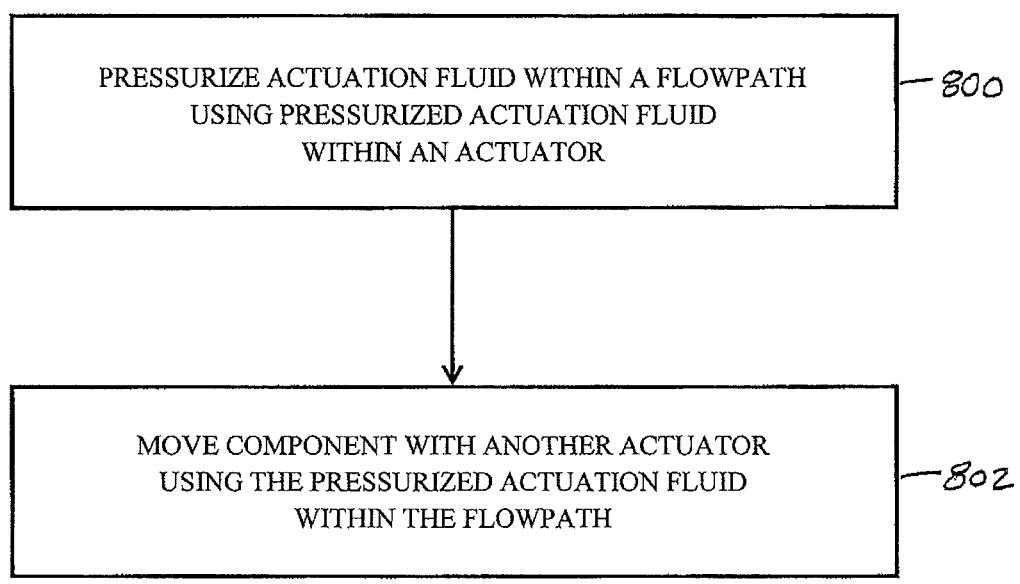
FIG. 8 is a flow diagram of a hydrosymbiotic method involving the actuation system of FIG. 7.

FIG. 8 is a flow diagram of a method for operating an actuation system such as, for example, the system 20 of FIG. 7. It is worth noting, the method of FIG. 8 is described below assuming a starting condition that actuation fluid pressure within, for example, the chamber $56_1$ (or alternatively the chamber $58_1$) is greater than actuation fluid pressure within the flowpath 85. This assumed condition may occur where, subsequent to pressurizing the quantity of actuation fluid within the chamber $56_1$, (I) the pump 80 is depowered (e.g., turned off or placed on standby), (II) the pump 80 is operated at lower capacity and/or (III) the pump 80 cannot keep up with actuation fluid pressure demands of the actuation system 20; e.g., the pump 80 is undersized or wearing out, or a large quantity of actuators substantially contemporaneously require pressurized actuation fluid.

In step 800, the pressurized actuation fluid within at least the actuator $26_1$ is utilized to boost (or maintain) the actuation fluid pressure within the flowpath 85. For example, the pressurized actuation fluid within the chamber $56_1$ is utilized to further pressurize the actuation fluid within the flowpath 85. More particularly, rather than increasing pump 80 output to increase actuation fluid pressure within the flowpath 85 to meet or prepare for system 20 demands, the valve $40_1$ may be signaled to fluidly couple the chamber $56_1$ to the flowpath 85 and thereby increase actuation fluid pressure in the flowpath 85.

It is worth noting, the afore-described actuation fluid pressure release from the chamber $56_1$ may cause the component $22_1$ to move, for example, downwards. The boost step may be particularly advantageous to perform therefore where the need to boost actuation fluid pressure within the flowpath 85 coincides with or follows a command to move the component 22, for example, in a gravitationally downward direction. Alternatively, however, the other valve $42_1$ may be operated to maintain the component $22_1$ in a static position. For example, both of the valves $40_1$ and $42_1$ may be opened to convert the actuator $26_1$ from a relatively stiff actuator to a relatively compliant actuator/damper. The actuator $26_1$ is therefore not actuated and, thus, does not move the component $22_1$.

In step 802, the actuation system 20 moves the actuatable component $22_N$ in, for example, the first (e.g., gravitational) upward) direction. In particular, the controller may signal the first valve $40_N$ to direct a regulated flow of the pressurized actuation fluid from the flowpath 85 into the first chamber $56_N$. The controller may also signal the second valve $42_N$ to direct a regulated flow of the actuation fluid within the second chamber $58_N$ into the flowpath 86. In this manner, the actuation fluid within the first chamber $56_N$ may push the piston $50_N$ towards the second chamber $58_N$ and thereby cause the respective shaft to move the actuatable component $22_N$ (e.g., upwards).

In some embodiments, the step 802 may be performed substantially simultaneously with performance of the step 800. In other embodiments, the step 802 may be performed subsequent to performance of the step 800.

In some embodiments, pressurized actuation fluid within one or more actuator chambers other than the chamber $56_1$ (e.g., where N>2) may also be utilized to boost the pressure of the actuation fluid within the flowpath 85. In addition or alternatively, the boosted pressurized actuation fluid within the flowpath 85 may be directed into one or more actuator chambers other than the chamber $56_N$. These additional actuator chamber(s) may be in actuator(s) other than the actuator $26_1$. However, in some embodiments, the pressurized actuation fluid within one chamber (e.g., chamber $56_1$) of an actuator may be utilized to pressurize actuation fluid within another chamber (e.g., chamber $58_1$) of that same actuator.

In some embodiments, the pump 80 may be signaled to concurrently further pressurize the actuation fluid within the flowpath 85. In other embodiments, the pump 80 may be nonoperational or depowered during the performance of the steps 800 and/or 802.

Operating the actuator system 20 in one of the afore-described LOW-HIGH operating mode embodiments may be useful to increase energy efficiency of the system 20. For example, by at least partially pressurizing the actuation fluid within one actuator chamber using pressurized actuation fluid from another actuator chamber, the actuation system 20 can reduce pressure demands on and energy consumption by the pump 80. In addition or alternatively, the actuator system 20 may be configured with a relatively low output pump 80, which may further reduce actuation system 20 costs.

In some embodiments, one or more or each of the actuators $26_1$-$26_N$ of FIG. 7 may be operated in the same mode of operation; e.g., the HIGH-LOW, HIGH-HIGH, LOW-LOW or LOW-HIGH mode of operation. In some embodiments, one or more or each of the actuators $26_1$-$26_N$ may be operated in different modes of operation. For example, the actuator $26_1$ may be operated in the HIGH-HIGH or LOW-LOW mode of operation and the actuator $26_N$ may be operated in the LOW-HIGH mode of operation.

Figure 9:
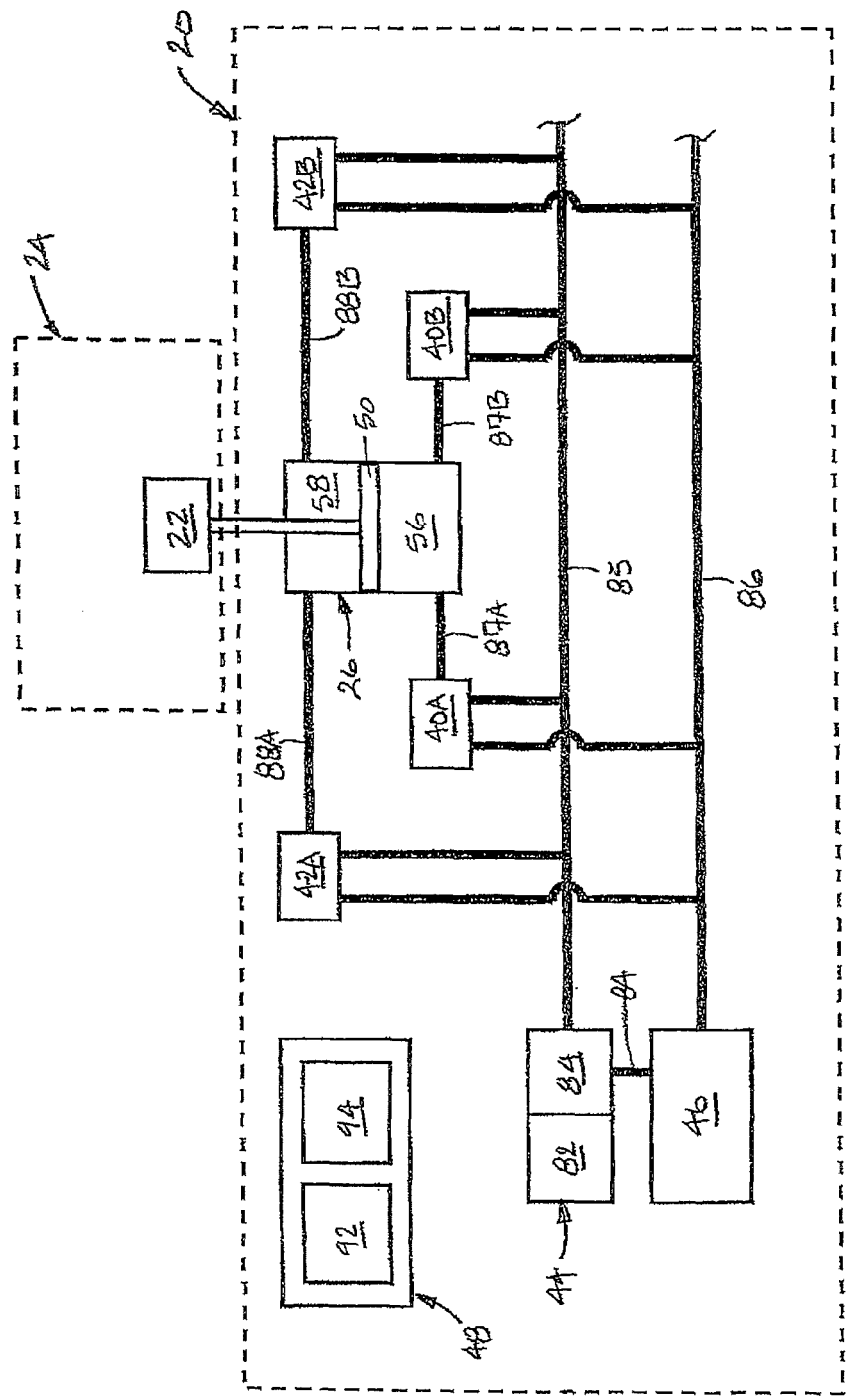
FIG. 9 is a block diagram of an alternate embodiment actuation system for moving at least one actuatable component.

FIG. 9 illustrates another embodiment of the actuation system 20. In this embodiment, the at least one actuator 26 is configured with more than two valves. In particular, the first chamber 56 is fluidly coupled, in parallel, with a pair of discrete first valves 40A and 40B. The first valve 40A is fluidly coupled inline with the flowpath 87A, which is fluidly coupled with the first chamber 56. The first valve 40B is fluidly coupled inline with the flowpath 87B, which is fluidly coupled with the first chamber 56 and configured in parallel with the flowpath 87A. Each of the first valves 40A and 40B may have a similar configuration to the first valve 40 described above.

The second chamber 58 is fluidly coupled, in parallel, with a pair of discrete second valves 42A and 42B. The second valve 42A is fluidly coupled inline with the flowpath 88A, which is fluidly coupled with the second chamber 58. The second valve 42B is fluidly coupled inline with the flowpath 88B, which is fluidly coupled with the second chamber 58 and configured in parallel with the flowpath 88A. Each of the second valves 42A and 42B may have a similar configuration to the second valve 42 described above.

During operation, the first valves 40A and 40B and the second valves 42A and 42B may be independently operated, but in cooperation with one another, to provide a relatively high degree of control over movement of the piston 50 and the actuatable component 22. Acceleration of the piston 50 and the actuatable component 22 may be increased (or decreased), for example, by (I) opening one of the first valves (e.g., 40A) serially before opening the other first valve (e.g., 40B) and/or (II) opening one of the second valves (e.g., 42A) serially before opening the other second valve (e.g., 42B). Similarly, deceleration of the piston 50 and the actuatable component 22 may be decreased (or increased), for example, by (I) closing one of the first valves (e.g., 40A) serially before closing the other first valve (e.g., 40B) and/or (II) closing one of the second valves (e.g., 42A) serially before closing the other second valve (e.g., 42B). In this manner, the actuation system 20 of FIG. 9 may substantially reduce or eliminate "choppy" or "jerky" movement of the piston 50 and, thus, the actuatable component 22. This in turn may lead to smoother (e.g., more fluid) and more "natural" movement of the actuatable component 22, which may be especially desirable when the actuatable component 22 is part of a robotic actuator arm or a high precision manufacturing manipulator; e.g., a robotic welding or machining system, etc.

In addition to providing smoother actuatable component 22 movement as described above, the actuation system 20 of FIG. 9 may also be operated for relatively fast movement during, for example, emergency situations. For example, the piston 50 and the actuatable component 22 may be rapidly accelerated and moved by opening the valves 40A, 40B, 42A and 42B substantially simultaneously. Similarly, the piston 50 and the actuatable component 22 may be rapidly decelerated and stopped by closing the valves 40A, 40B, 42A and 42B substantially simultaneously.

In some embodiments, the valves 40A, 40B, 42A and 42B may be configured with substantially equal maximum flow rates and actuation rates. Alternatively, the valves 40A, 40B, 42A and/or 42B may be configured with different maximum flow rates and/or different actuation rates. For example, the first valve 40A and the second valve 42A may be configured with substantially equal first maximum flow rates and/or first actuation rates. The first valve 40B and the second valve 42B may be configured with substantially equal second maximum flow rates and/or second actuation rates, which rates are different (e.g., less) than the first maximum flow rates and/or first actuation rates. In such embodiments, the first valve 40A and the second valve 42A may be configured for gross control of the fluid flow into/out of the chambers 56 and 58 and, thus, for gross control of the actuator 26. For example, more than fifty percent (e.g., more than seventy-five percent) of the actuation fluid directed into or out of the chambers 56 and 58 may flow through the valves 40A and 42A. The first valve 40B and the second valve 42B may be configured for fine control of the fluid flow into/out of the chambers 56 and 58 and, thus, for fine control of the actuator 26. For example, less than fifty percent (e.g., less than twenty-five percent) of the actuation fluid directed into or out of the chambers 56 and 58 may flow through the valves 40B and 42B. In this manner, precision and/or accuracy of actuator control and actuatable component 22 movement may be increased.

The term "maximum flow rate" describes a flow rate of fluid through a valve when that valve is fully open for a given pressure differential across the valve orifices. Referring to FIGS. 4 and 5, the maximum flow rate may be limited by the size of the orifice 78. Alternatively, the maximum flow rate may be limited by the size of the orifice 76 and/or orifice 77. In such an embodiment, the maximum flow rate through the orifice 76 may be different than (or substantially equal to) the maximum flow rate through the orifice 77.

The term "actuation rate" describes a rate at which a valve can be opened and/or closed. For example, referring still to FIGS. 4 and 5, the actuation rate may be set by the speed the motor 70 can push or pull the valve element 64. The actuation rate may also or alternatively be set by the length of stroke and/or how many turns the valve element 64 must make to move between the closed position (see FIG. 3) and open position (see FIGS. 4 and 5). In general, the actuation rate for opening and closing the valve 40, 42 are substantially equal and constant. However, in some embodiments, it may be desirable for the opening actuation rate to be different than the closing actuation rate. In addition or alternatively, in some embodiments, it may be desirable for the opening and/or closing actuation rates to be variable; e.g., where the motor 70 is a variable speed motor.

Figure 10:
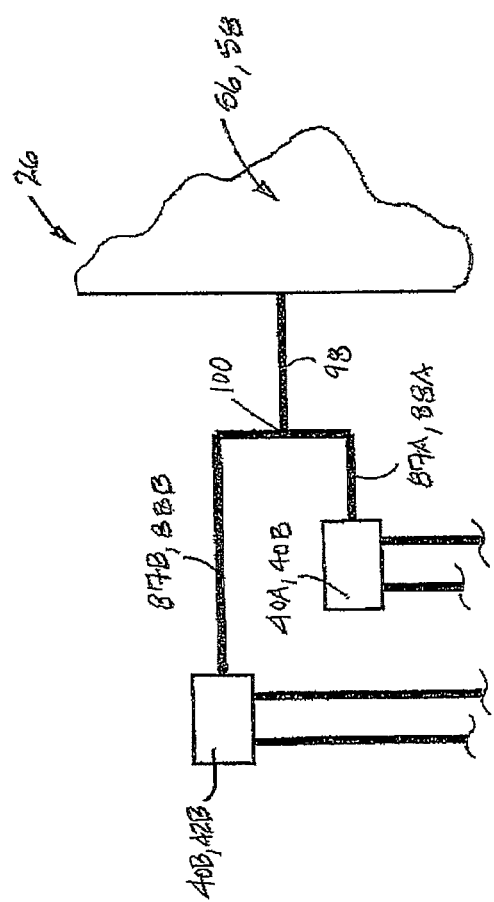
FIG. 10 is a block diagram of a fluid coupling between a plurality of parallel valves and a chamber of an actuator.

The valves 40A, 40B, 42A and 42B are illustrated in FIG. 9 as being respectively fluidly coupled to the chambers 56 and 58 of the actuator 26 through discrete flowpaths 87A, 87B, 88A and 88B; e.g., parallel conduits. In some embodiments however, as illustrated in FIG. 10, the respective valves 40A, 40B, 42A and 42B may be configured in parallel as described above, but be fluidly coupled to the respective chamber 56, 58 by a single flowpath 98. For example, the flowpaths 87A and 87B, 88A and 88B may converge together at a path consolidator 100 and be fluidly coupled to the chamber 56, 58 by the single flowpath 98.

Figure 11:
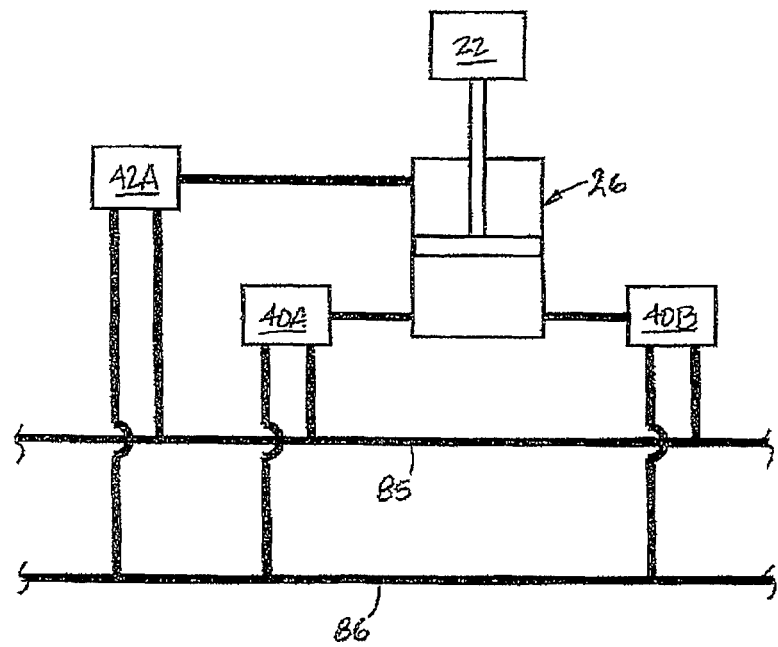
FIGS. 11 and 12 are block diagrams of additional alternate embodiment actuation systems for moving at least one actuatable component.
Figure 12:
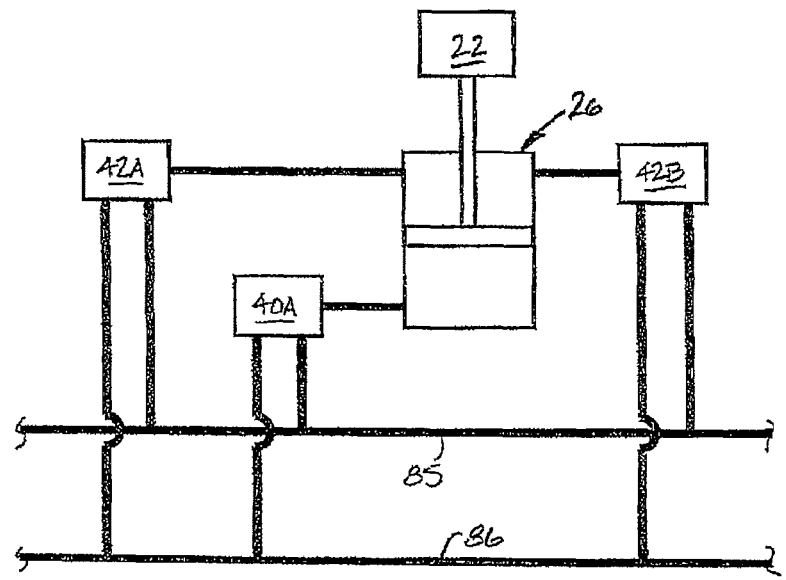

The actuation system 20 may have various configurations other than those described above. For example, referring to FIGS. 11 and 12, the actuator 26 may be configured with an odd number of valves; e.g., three valves. Such embodiments may be utilized where, for example, a high degree of actuator control is only required in a certain direction; e.g., along an upward cylinder stroke (see FIG. 11) or a downward cylinder stoke (see FIG. 12). The actuation system 20 of the present disclosure is not limited to the specific embodiments described herein and illustrated in the drawings.

It is to be understood that the terminology used herein is used for the purpose of describing specific embodiments, and is not intended to limit the scope of the present disclosure. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

What is claimed is:

1. A mobile robot comprising:
  a first hydraulic fluid actuator having a first cylinder comprising a first piston that defines a first chamber and a second chamber in the first cylinder, the first piston having a first stem extending to an exterior of the first cylinder for desired activation of at least a first actuatable component of the mobile robot, wherein the first hydraulic fluid actuator has exactly three orifices;
  a second hydraulic fluid actuator having a second cylinder comprising a second piston that defines a first chamber and a second chamber in the second cylinder, the second piston having a second stem extending to an exterior of the second cylinder for desired activation of at least a second actuatable component of the mobile robot;

a first valve and a second valve, each in direct, independent operable engagement with the first hydraulic fluid actuator, each of the first valve and the second valve capable, via the exactly three orifices in the first hydraulic fluid actuator, of being fully open or closed as well as any intermediate position as desired to vary a flow of a hydraulic fluid both into and out of the first hydraulic fluid actuator, and wherein a respective valve element in each of the first valve and the second valve cannot simultaneously close more than one of the exactly three orifices in the first hydraulic fluid actuator providing access to each of the first valve and the second valve;

a third valve and a fourth valve, each in direct, independent operable engagement with the second hydraulic fluid actuator, each of the third valve and the fourth valve capable of being fully open or closed as well as any intermediate position as desired to vary a flow of a hydraulic fluid both into and out of the second hydraulic fluid actuator;

a hydraulic fluid pump, a hydraulic fluid reservoir having a substantially incompressible hydraulic fluid and a hydraulic fluid line system for operable engagement with at least the first valve, the second valve, the third valve and the fourth valve, the hydraulic fluid line system comprising a single fluid input line into each valve in operable communication with the hydraulic fluid pump to supply the substantially incompressible hydraulic fluid under pressure to either the first chamber or the second chamber of both the first hydraulic fluid actuator and the second hydraulic fluid actuator based on a respective position of the first piston and the second piston and a respective output line out of each valve in operable communication with the hydraulic fluid reservoir to enable draining of both the first chamber and the second chamber of both the first hydraulic fluid actuator and the second hydraulic fluid actuator to the hydraulic fluid reservoir as desired, the respective output line comprising a first chamber output line for each first chamber in the first hydraulic fluid actuator and the second hydraulic fluid actuator and a second chamber output line for each second chamber of the first hydraulic fluid actuator and the second hydraulic fluid actuator;

a control system at least in operable communication with the first valve, the second valve, the third valve and the fourth valve, the first hydraulic fluid actuator and the second hydraulic fluid actuator as well as the first actuatable component and the second actuatable component of the mobile robot, at least two sensors, one each for determining actuation of the first actuatable component and the second actuatable component of the mobile robot, and the hydraulic fluid pump, the control system capable of determining a desired motion to be undertaken by the first actuatable component and the second actuatable component of the mobile robot and loads to be moved by them without any user input information with regard to the desired motion to be undertaken by the first actuatable component and the second actuatable component of the mobile robot and the loads to be moved by them and activating the first valve, the second valve, the third valve and the fourth valve to simultaneously drain hydraulic fluid under pressure from the first hydraulic fluid actuator and provide that fluid to the second hydraulic fluid actuator so that precise control of the first hydraulic fluid actuator and the second hydraulic fluid actuator can be achieved by using fluid pressure only from the first hydraulic fluid actuator and the pressure can be adjusted by the control system to match a required load to be moved by the second actuatable component of the second hydraulic fluid actuator to at least reduce a need to activate the hydraulic fluid pump and conserve power as needed.

2. The mobile robot as defined in claim 1, wherein the control system further determines if enough pressure can be provided by the first hydraulic fluid actuator to move a desired load and if not provides hydraulic fluid to the second hydraulic fluid actuator from the hydraulic fluid reservoir along with fluid from the first hydraulic fluid actuator in order to enable quick and efficient operation of the second hydraulic fluid actuator and thus the second actuatable component of the second hydraulic fluid actuator.

3. The mobile robot as defined in claim 1, wherein the control system determines the desired motion to be undertaken the first hydraulic fluid actuator and the second hydraulic fluid actuator as well as the loads to be moved by each of the first hydraulic fluid actuator and the second hydraulic fluid actuator.

4. The mobile robot as defined in claim 1, wherein the control system determines the desired motion to be undertaken by the first hydraulic fluid actuator and the second hydraulic fluid actuator as well as the loads to be moved by each of the first hydraulic fluid actuator and the second hydraulic fluid actuator based on a task to be accomplished.

5. The mobile robot as defined in claim 1, wherein the first actuatable component and the second actuatable component of the mobile robot are appendages of the mobile robot.

6. The mobile robot as defined in claim 1, wherein the first actuatable component and the second actuatable component of the mobile robot are arm members of the mobile robot.

7. The mobile robot of claim 1, wherein the second hydraulic fluid actuator further comprises a set of exactly three orifices and wherein each of the third valve and the fourth valve are capable, via the set of exactly three orifices in the second hydraulic fluid actuator, of being fully open or closed as well as any intermediate position as desired to vary a flow of a hydraulic fluid both into and out of the second hydraulic fluid actuator.

8. The mobile robot of claim 7, wherein a respective valve element in each of the third valve and the fourth valve cannot simultaneously close more than one of the set of exactly three orifices in the second hydraulic fluid actuator providing access to each of the third valve and the fourth valve.

* * * * *